United States Patent Office 3,420,369
Patented Jan. 7, 1969

3,420,369
BOTTLE GAUGING
Thomas B. Sorbie, Toledo, Ohio, assignor to Owens-Illinois, Inc., a corporation of Ohio
Filed Nov. 22, 1966, Ser. No. 596,109
U.S. Cl. 209—80                 7 Claims
Int. Cl. B07c 5/08

ABSTRACT OF THE DISCLOSURE

Apparatus for gauging the upper rim surface of glass containers for a symmetrical defect known as "warp." A container, positioned at a predetermined location, is rotated about its vertical axis. A pair of differential transformers are connected in series adding relationship, having their armatures in contacting relationship with diametrically opposed points on the container rim and provide a signal output proportioned to the means height of the container. A reject is provided when the signal exceeds a predetermined amount.

---

This invention relates to the inspection of containers and in particular to the gauging of hollow containers such as glass bottles and jars to determine whether the containers are within height tolerances and whether the top sealing surface is within proper specification.

Glass containers such as bottles and jars are presently handled by automatic equipment in the packers' plants. This equipment is of the high speed type. Thus it becomes essential that certain dimensions and tolerances be maintained in the manufacture of the glass containers and particularly in the top surface of the finish of the container when the top surface is used for sealing.

The dimensional defects which have been determined as critical include moderate variations in slope of the top surface of the finish as evidenced by variations in height of the top surface around a portion of the periphery, commonly known as "warp." More abrupt variations in the slope of the top surface of the finish as evidenced by variations in the height of the top surface around a lesser portion of the periphery than for warp are known as "dips."

A further defect known as "cocked finish" is evidenced by extreme variations between the highest point and the lowest point on the top surface. This defect is also known as a "tilt finish."

A still further common defect which must be gauged is "over and under height." As would be expected, if the container itself is too high, it may jam the equipment used for filling and sealing the container, or if the container is too short, again the sealing equipment would not operate satisfactorily, thus resulting in the improperly filled or sealed container.

In view of the foregoing, it is an object of this invention to provide a method and apparatus for inspecting hollow containers.

It is a further object of this invention to provide a method and apparatus for inspecting such containers to determine excessive warp of the finish of the container.

It is an additional object of this invention to provide a method and apparatus for inspecting containers wherein the containers are simultaneously inspected for excessive "warp," "dip," "cocked finish" and "over or under height."

Figure 1:
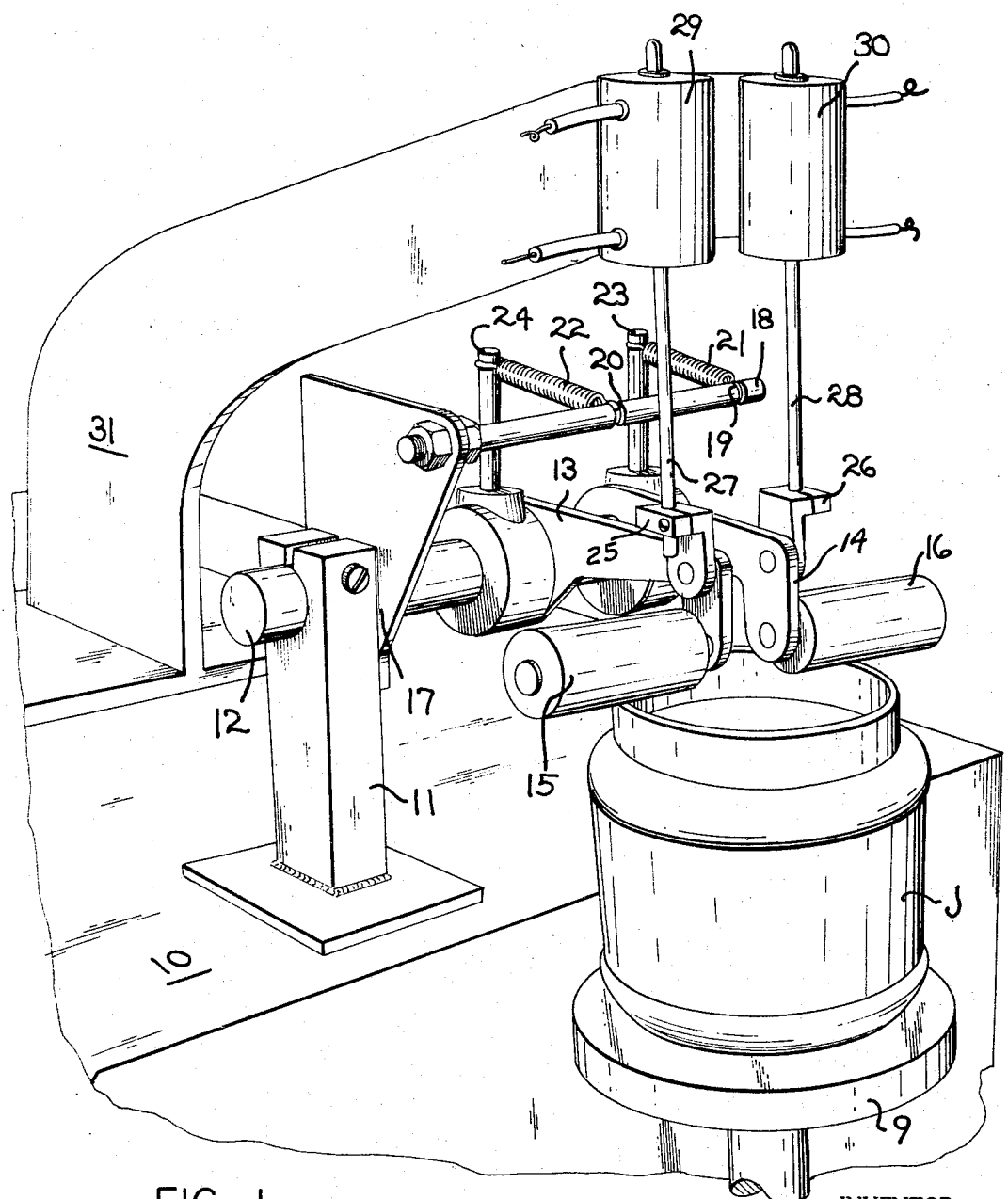
Figure 2:
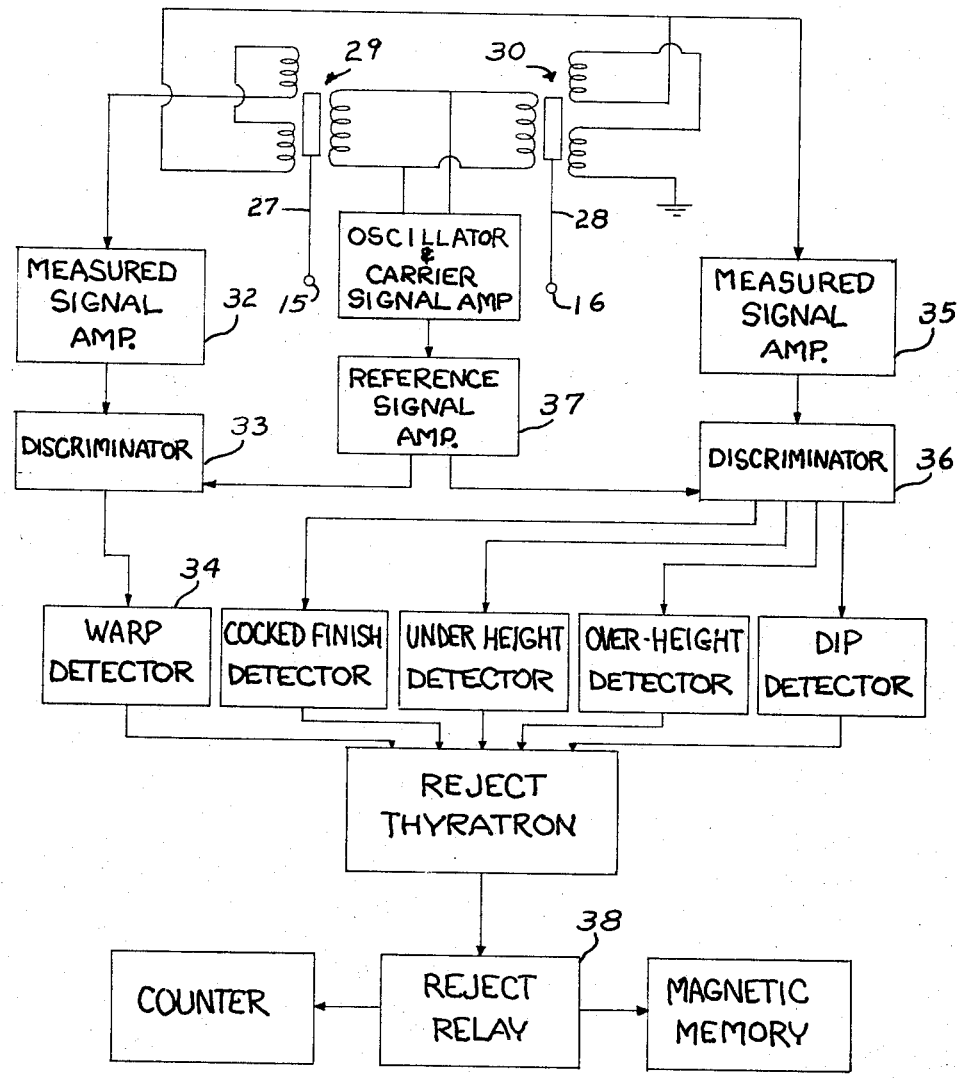

Other and further objects will be apparent from the following description taken in conjunction with the annexed sheets of drawings, wherein:

FIG. 1 is a fragmentary perspective view of the apparatus embodying the invention; and, FIG. 2 is a block diagram of the electronic circuitry used for analyzing the signals from the differential transformers.

Basically, the invention involves the positioning of a container at a predetermined location and rotating the container while at this location. Bringing a pair of contact members into engagement with top surface of the container at diametrically opposed points on the surface while causing relative rotation of the container with respect to the contact members so that the contact members traverse or scan the entire upper circumferential surface of the container finish.

The height of the two contact members, as the container is rotated, are translated into electrical voltages by the use of differential transformers, one individual to each contact member, and electronic means for analyzing the voltage signals received from the differential transformers to determine whether there is excessive "warp." The output from one of the transformers is used to gauge "dip," "cocked finish" or whether the height of the container exceeds predetermined upper and lower limits.

Referring to FIG. 1, the apparatus is intended for inspecting hollow containers such as glass jars J. The jars J are of the wide mouth type having an open upper and commonly referred to as the "finish" whose upper annular surface is normally the sealing surface. The jars J are adapted to be brought into the gauging position by a bottle transfer carriage such as that disclosed and described in the patent to Fedorchak et al., 2,682,802. After being brought into position, defined by the pad 9, the jar and pad are raised by mechanism (not shown), and the pad and jar rotated.

The gauging apparatus comprises a base 10 to which an upstanding support pedestal 11 is fixed. The support pedestal 11 carries one end of a horizontal shaft 12 clamped thereto with the shaft extending parallel to and spaced from the position of the bottles as they are brought in to the gauging station. The shaft 12 is adapted to support a pair of spaced-apart levers 13 and 14. The levers 13 and 14 are mounted for vertical, rocking motion relative to the shaft 12. Each of the levers 13 and 14 extends substantially horizontally outward and each carries a gauging roller 15 and 16 at the outward ends thereof, respectively.

An anchor plate 17, fixed to the pedestal 11, has a pin 18 bolted thereto, with the pin extending in a horizontal direction generally parallel to the shaft 12, but positioned thereabove and slightly forward. The pin 18 is formed with a pair of longitudinally spaced grooves 19 and 20 within which one end of a pair of tension springs 21 and 22 is adapted to be seated. The opposite end of the springs is fixed to a pair of vertically extending pins 23 and 24. The pins 23 and 24 are connected to the levers 13 and 14 and extend radially outward therefrom.

As can readily be seen when viewing FIG. 1, the pins 23 and 24 extend substantially vertical and the springs 21 and 22 will be normally under tension, thus serving to bias the levers 13 and 14 in a clockwise or downward direction thus serving to hold the gauging rollers 15 and 16 in contact with the upper surface of the jar.

The levers 13 and 14 are provided with clamps 25 and 26 which are pivotally connected thereto on axes which are vertically above the axes of the rollers 15 and 16. The clamps 25 and 26 support rods 27 and 28 respectively. The cores or armatures of a pair of differential transformers 29 and 30 are connected to the upper ends of rods 27 and 28. The differential transformers are supported by a bracket 31 which is mounted on the base 10.

It should be understood that the clamps 25 and 26 are actually connected to the levers 13 and 14 by rotatable connections so that upward and downward movements of the rollers and pivotal movement of the levers, which would be to a slight extent non-linear, would be translated into precise vertical motion with respect to the transformer cores or armatures.

As explained above, the transformers have their secondary windings connected in series, with the series output from the transformers 29 and 30 being fed to a signal amplifier 32, discriminator 33 and warp detector 34, as shown in FIG. 2.

It will be readily appreciated that the cores or armatures of the transformers 29 and 30 are initially positioned in relation to the rollers 15 and 16 so that the cores will occupy the electrical center of the transformers 29 and 30 when a standard height container is placed in the measuring apparatus. Any deviation of the rim surface of the container from this pre-selected horizontal plane will obviously alter the coupling of the primary and secondaries of the transformers so as to provide a voltage output which varies in phase with whether the core is above or below the electrical center and in amplitude depending upon the extent of movement of the core above or below the electrical center. This is the normal function of a differential transformer.

The output from the transformer 30 is also connected to a signal amplifier 35 whose output is fed to a discriminator 36 where the signal received is compared with that of a reference signal coming from the reference signal amplifier 37. As is shown in FIG. 2, the reference signal amplifier output is also fed to the discriminator 33.

Details and functions of these well-known electronic components are fully and completely disclosed in Patent No. 3,273,710 issued Sept. 20, 1966, in which applicant is a co-inventor.

As can be seen when view in FIG. 2, the output of the warp detector 34 and the other detector channels indicated on the drawing are fed to a reject thyratron which in turn has its output connected to a reject relay 38. The reject relay may operate a reject solenoid in the usual manner, or may actuate a magnetic memory system and alternatively could operate a counter as schematically shown in FIG. 2.

It can readily be seen that the distinction between the present application and the above-referred-to patent, is in the inclusion of an additional differential transformer and the summing of the outputs of these two transformers being utilized to produce a signal for operating the warped detector channel of the electronic circuitry.

It has been applicant's experience that by providing a pair of rollers or contact members and individually sensing the position of the rollers, and in turn summing the resultant signals, that a more accurate signal will be received than by providing the output from a single differential transformer.

As can readily be seen, the cores, when displaced by a tilted or cocked finish, will move equal distances about the mean height of the bottle. The sum output of the two differential transformers, therefore, will not vary when a tilted finish is being measured, since the upward movement of one core will be counter-balanced by the downward movement of the other. In this manner a tilted finish bottle will not erroneously actuate the warped finish detector portion of the inspection system. When a warped bottle is being measured, the output signal received from the two transformers connected in series will change since the mean level of the cores will change as the rollers traverse the contours of the rim of the container.

Thus, by the use of two differential transformers having their output windings connected in series, with the outputs of the two transformers being algebraically added, the voltage signal which is fed to the discriminator will be a voltage proportional to the average or mean height of the container. This average signal and the ability to provide such a signal is the important aspect of the invention since it assures that the rejection of containers, due to warped finish, will be accomplished without erroneous indications that a warped finish is being sensed when, in fact, a tilted or cocked finish container is being gauged.

It is extremely important to be able to distinguish between warped finishes and tilt finishes since correction or control of forming machine operations is dependent upon the proper identification of the defect being produced.

While the above described apparatus is specifically shown as being used to gauge the finish of wide mouth containers, it should be obvious that the invention will have equal utility in gauging narrow neck containers. It will be readily appreciated that adaptation of the above described device for gauging narrow neck conttainers may be easily accomplished by reversing the position of the levers 13 and 14 so that they are connected to the outer ends of gauging rollers 15 and 16 so that the inner ends of the rollers 15 and 16 may be separated by a distance less than the diameter of a narrow neck bottle, thus providing a mechanism in which the rollers will contact diametrically opposed surface portions of the finish of narrow neck containers.

It has been applicant's experience that warped finishes are seldom, if ever, produced in bottles where there would be a hump on one side of the bottle and a depression or low area on the other side of the bottle.

In summary, it can be seen that applicant has provided an apparatus for measuring and inspecting containers to determine whether the rim of the container is warped, as well as providing apparatus which operates to detect over and under height containers, cocked finish containers or containers having dips in the rim surface.

Other and further modifications may be resorted to without departing from the spirit and scope of the appended claims.

I claim:

1. The method of inspecting the finish of a hollow container for "warp" which comprises, bringing a pair of contact members into contact with the top surface of the finish at diametrically opposed points, causing relative motion between the container and the contact members to cause the contact members to traverse the entire top surface of the finish of the container whereby the vertical positions of the contact members will vary in accordance with the height of the finish at any predetermined points on the top surface of the finish, continuously sensing the vertical positions of the contact members and rejecting the container when the sum of the vertical positions of the contact members deviates from a predetermined value.

2. The method of claim 1, wherein the step of continuously sensing the vertical positions of the contact members comprises the step of continuously converting the sensed vertical positions into electrical voltages having phase and amplitude corresponding to the vertical positions of the members and further including the step of algebraically adding the voltage outputs to provide a signal indicative of the average height of the container for reject purposes.

3. Apparatus for inspecting the rim of a hollow glass container comprising two contact members adapted to contact diametrically opposed points on the rim of a container, means supporting said members for independent vertical movement, a pair of differential transformers, core means movable axially in each of said transformers to produce output voltage signals which vary in phase and amplitude depending upon the position of the core relative to the electrical centers thereof, means connecting said contact members to the armatures, circuit means interconnecting the output signals of said transformers in series adding relationship and means connected to said circuit means for indicating an output signal from said transformers which exceeds a predetermined value.

4. The apparatus of claim 3, wherein said contact members comprise a pair of coaxially aligned rollers mounted for rolling contact with the rim of the container being inspected.

5. The apparatus of claim 4, wherein said means supporting said members comprises a pair of pivoted arms, each arm being connected to a roller and biasing means urging said arms downwardly for maintaining the rollers in contact with the container rim.

6. Apparatus for inspecting the rim of a hollow glass container comprising a pair of contact members adapted to contact diametrically opposed points on the rim surface of the container, means connected to said members for biasing said members into contact with the rim of a container under inspection, means providing relative movement between the container and the members whereby the members traverse the entire rim of the container, vertical position sensing means connected to said members, means connecting said sensing means together to provide an output signal which is the algebraic sum of the vertical positions of said members, means for producing a reference signal, discriminator means connected to both the output of said summing means and reference signal, means for comparing the two signals and providing an output signal proportional to the difference, detector means connected to the output of said discriminator means for providing a reject signal when said difference signal is greater than a predetermined level and reject means connected to said detector to receive said reject signal.

7. The apparatus of claim 6, wherein said contact members are coaxial rollers of the same diameter.

References Cited
UNITED STATES PATENTS

| | | | |
|---|---|---|---|
| 3,073,034 | 1/1963 | Antoszewski | 209—88 X |
| 3,188,743 | 6/1965 | Strazala | 33—174 |
| 3,196,550 | 7/1965 | McMeekin | 33—174 |
| 3,273,710 | 9/1966 | Early | 209—88 |

M. HENSON WOOD, JR., *Primary Examiner.*

R. A. SCHACHER, *Assistant Examiner.*

U.S. Cl. X.R.

33—174; 209—88